United States Patent [19]
Finkenzeller et al.

[11] 4,433,429
[45] Feb. 21, 1984

[54] DIAGNOSTIC X-RAY INSTALLATION FOR RADIOGRAPHY AND FLUOROSCOPY

[75] Inventors: Johann Finkenzeller, Erlangen; Juergen Reinhardt, Aurachtal, both of Fed. Rep. of Germany

[73] Assignee: Siemens Aktiengesellschaft, Berlin and Munich, Fed. Rep. of Germany

[21] Appl. No.: 238,942

[22] Filed: Feb. 27, 1981

[30] Foreign Application Priority Data

Mar. 18, 1980 [DE] Fed. Rep. of Germany ....... 3010378

[51] Int. Cl.³ .............................................. H05G 1/28
[52] U.S. Cl. ...................................... 378/99; 378/165
[58] Field of Search ........................... 378/99, 98, 165

[56]  References Cited
U.S. PATENT DOCUMENTS 4,047,044  9/1977  Weaver ................................. 378/99
4,245,244  1/1981  Lijewski .............................. 378/99

OTHER PUBLICATIONS

"Klinograph 2 with Explorator 35 E", *DATA*, Siemens Aktiengesellschaft, Order No. MR 12/7167.101, pp. 1-5.

*Primary Examiner*—Craig E. Church
*Attorney, Agent, or Firm*—Hill, Van Santen, Steadman & Simpson

[57] ABSTRACT

In an exemplary embodiment, an X-ray image intensifier television chain includes an X-ray image intensifier, a television camera, and a monitor, and a control unit has an adjustment panel for selecting radiography and fluoroscopy parameters. The control unit is connected with a signal generator whose output is connected to a mixing stage, arranged between the television camera and the monitor, so that a signal which is dependent upon the selected parameters is generated by the signal generator and is superimposed on the video signal delivered by the television camera for the purpose of fading-in a representation of the selected parameters in the television picture of the monitor.

5 Claims, 4 Drawing Figures

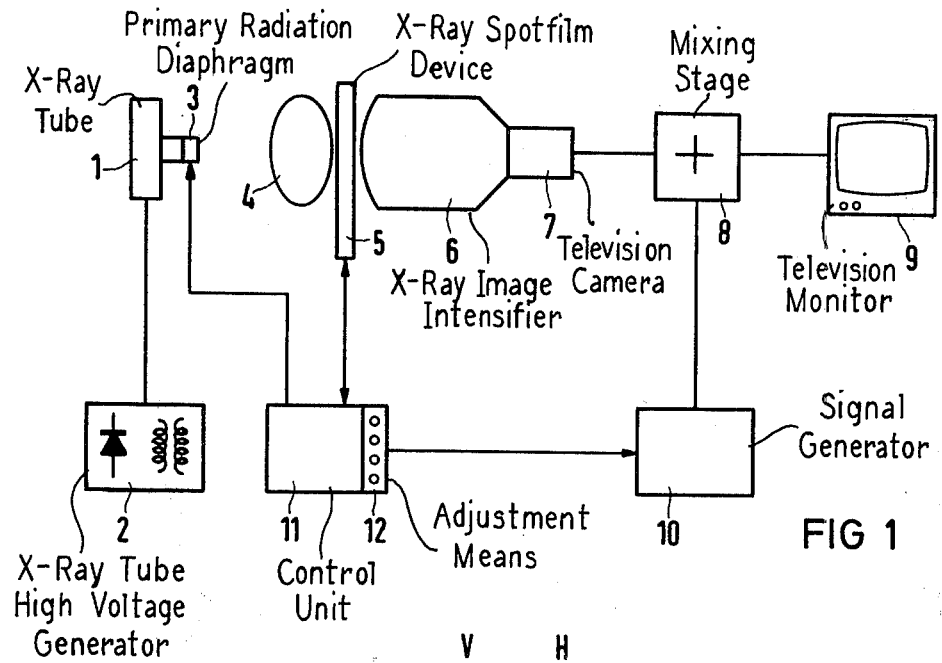
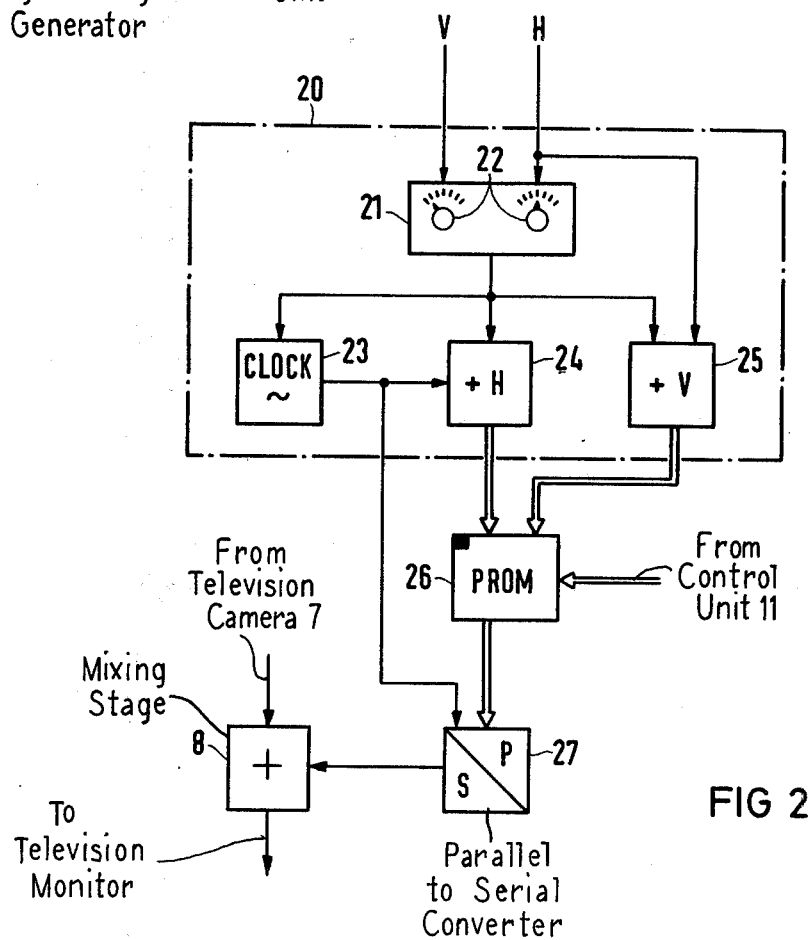

24x30

18x24

DIAGNOSTIC X-RAY INSTALLATION FOR RADIOGRAPHY AND FLUOROSCOPY

BACKGROUND OF THE INVENTION

The invention relates to a diagnostic X-ray installation for radiography and fluoroscopy which exhibits an X-ray image intensifier television chain comprising an X-ray image intensifier, a television camera, and a monitor, and a control unit having adjustment means for selecting radiography and fluoroscopy operating values.

X-ray diagnostic installations are known (Siemens data: Klinograph 2 with Explorator 35E, Order No. MR 12/7167.101), in which the values determining the radiography and fluoroscopy operations are adjusted on the apparatus and brought to display. Thus, for example, the tube voltage and current values are preselected by means of switches. The instantaneous values can be displayed in digital or also analog fashion by means of display instruments. For a radiograph, the required film cassettes are inserted in the X-ray spotfilm device and automatically driven into the readiness position. A display of the inserted film format does not customarily take place. In order that several radiographs can be made in succession, the film format can be subdivided. The subdivision can be selected by adjustment means, whereby the selected subdivision is characterized by the position (or setting) of the adjustment means on the spotfilm device or in the remote control console. A digital display indicates the program sequence and specifies the number of the remaining unexposed radiographs. Due to the varying display types, the adjusted values can be recognized only with difficulty. Moreover, during adjustment and alignment of the X-ray spotfilm device, the television monitor is customarily observed, so that the displays lie outside the line of sight and possibly even outside the field of view.

SUMMARY OF THE INVENTION

The invention proceeds from the object of producing a diagnostic X-ray installation of the type initially cited which exhibits a clear and advantageously positioned display of the radiograph and fluoroscopy values, wherein several related values can be determined together.

The object is achieved in accordance with the invention in that the adjustment means are connected to a signal generator whose output is connected to a mixing stage arranged between the T.V. camera and the monitor, in which mixing stage a signal-dependent upon the adjusted values and generated by the signal generator is superimposed on the video signal delivered by the T.V. camera for the purpose of fading in the adjusted values into the television picture of the monitor. As a consequence, values can be faded into the free, darkened areas of the viewing screen, which values are so clearly displayed that they can be determined by the observer at a glance.

An advantageous embodiment of the signal generator is one wherein the signal generator exhibits a manually controllable position determining unit which is subjected to the synchronous pulses of the television camera and generates output signals determining the position of the fading-in; that a memory is present in which data corresponding to the values to be displayed are stored, and to which the signals of the position determining unit are supplied in the form of addresses, and likewise the signals determining the fading-in, are supplied by the control unit, and that the output of the memory is connected with a converter which effects the adaptation of the output signal of the memory to the video signal and whose output is connected to the mixing stage.

In the case of a diagnostic X-ray installation comprising an X-ray spotfilm device for the preparation of radiographs, wherein the film format is adjustable by adjustment means, the fading-in can proceed in that a signal corresponding to the selected film exposure program is supplied to the mixing stage. A display of the film format is achieved when the signal supplied to the mixing stage effects a digital fading-in representing the size of the film. It has proven advantageous if the position of the film is displayed by means of a pictorial fading-in. The clarity can be even further increased if the subdivision of the film is represented by means of a symbolic fading-in. The program sequence is advantageously displayed when the faded-in image displays the number of exposed radiographs.

The invention shall be explained in greater detail in the following on the basis of an exemplary embodiment illustrated on the accompanying drawing sheets; and other objects, features and advantages will be apparent from this detailed disclosure and from the appended claims.

BRIEF DESCRIPTION OF THE DRAWINGS

FIG. 1 illustrates a block circuit diagram of an inventive X-ray diagnostic installation;

FIG. 2 illustrates a block circuit diagram of the signal generator of the diagnostic X-ray installation according to FIG. 1.

DETAILED DESCRIPTION

Figure 3A:
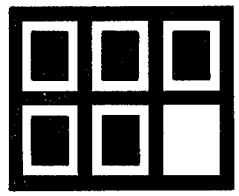
FIGS. 3a and 3b illustrate two fadings-in of the film format in the case of the diagnostic X-ray installation according to FIG. 1.

In FIG. 1, an X-ray tube 1 is illustrated which is fed by an X-ray generator 2. In front of the radiation exit aperture of the X-ray tube 1, a motor-adjustable collimator (or primary radiation diaphragm) 3 is seated. In the path of rays of the X-ray tube 1, a patient 4 is disposed. Behind the latter an X-ray spotfilm device 5 is arranged. In the path of rays thereafter, an X-ray image intensifier 6 follows which is connected with a television camera 7 to form a unit. Connected to the television camera 7 is a mixing stage 8 whose output signal is supplied to a monitor 9.

A signal generator 10 is likewise connected with the mixing stage 8, for supplying an output signal which is superimposed in the mixing stage 8 with the video signal delivered by the television camera 7. The control of the signal generator 10 is effected by a control unit 11 connected with the signal generator. In addition, the control unit 11 controls the motor-driven cassette entry of the X-ray spotfilm device 5. Via transmitters arranged on the X-ray spot film device 5, the size and position of the inserted cassette is communicated to the control unit 11 which, with these values, controls the opening of the collimator 3. This data is likewise supplied to the signal generator 10 which, as shall be described below, generates therewith a signal effecting the fading-in. Via adjustment means or film format setting means 12, which are connected with the control unit 11, the inserted cassette can be subdivided as desired. The control unit 11 controls, corresponding to the position (or setting) of the adjustment means 12, the collimator 3, the X-ray spot film device 5, and the signal generator 10.

In FIG. 2, the signal generator 10 is illustrated which exhibits a position determining unit 20. An input stage 21 of the position determining unit 20 is subjected to the horizontal and vertical pulses delivered by lines H and V from the television camera 7. This input stage 21 can exhibit counters and/or also monostable flip flops which determine the commencement of the fading-in by their chronological delay. This delay is variable through adjustment means 22, so that the position of the fading-in is adjustable in the vertical and horizontal directions on display 9. If the delay times of the input stage 21 have expired, a clock pulse generator 23 is started, and a horizontal counter 24—connected with the clock pulse generator 23—of the position determining unit 20 is released for counting of the clock pulses from the clock pulse generator 23. Simultaneously a vertical counter 25, likewise pertaining to the position determining unit 20, is released for counting the horizontal pulses supplied via line H from the television camera 7. The outputs of the counters 24 and 25 are connected with a memory 26; for example, a programmable read only memory or PROM, in which data are stored corresponding to the values to be displayed (the numbers and indicia). Additional digital data is supplied to the memory 26 by the control unit 11 in the form additional addresses which characterize the format and the cassette representation (or display). These addresses select a memory location in which the data for one character and one line, respectively, is stored. The contents of the memory 26 are supplied to a converter 27 which—driven by clock pulses from the clock pulse generator 23—converts the parallel data flow into a serial data flow. Subsequently, the level of the output signal is adapted (or matched) to that of the video signal so that the signals in the mixing stage 8 can be superimposed in the simplest fashion.

Through this arrangement, a simple fading-in of data; e.g. of data determining the format, into the television picture, is achieved. Through the layout of the memory and expansion of the capacity, more data can additionally be faded-in. Thus the simultaneous fading-in e.g. of the apparatus data (angular position of the X-ray tube), the fluoroscopy data (tube voltage, tube current, dose rate, and fluoroscopy time), the time data (date and clock time), the number of the radiographic exposure and the patient data (patient number) appears expedient. In so doing it is advisable to fade-in the data at various locations for a better overview.

Expediently the fadings-in proceed in the darkened areas of the television field. There they do not interfere with the X-ray television transmission and can be recognized without a change in the direction of view of the observer. These faded-in data can also be co-stored, so that all significant exposure values are thereby preserved without additional measures and characterize (or identify) the radiograph for the purpose of improved filing.

Figure 3B:
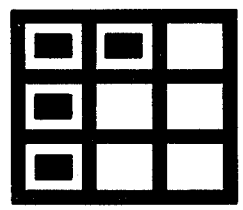

In addition to a digital display, a pictorial representation of the film format, illustrated in the FIGS. 3a and 3b, can also be provided. In this example, the indicia are formed by 32 lines with 32 image points each. The upper seven lines are reserved for the numerals (or digits) characterizing the size of the film format. The remaining 25 lines are employed for the pictorial representation (or display) of the position and of the subdivision of the cassette as well as of the exposed radiographs.

In FIG. 3a the cassette size amounts to 24 cm×30 cm and is characterized by the corresponding numerals. The height of the numerals amounts to seven image points, whereas the width amounts to five image points. A spacing of one image point was left between the characters. In the pictorial representation of the cassette format arranged therebelow, the longer side of the rectangular image lies in the horizontal direction. It is thereby rendered clear that the cassette was inserted horizontally. The cassette is subdivided in a six-fold fashion, whereby—characterized by the black fields—five radiographs are shown as already exposed in FIG. 3a. For the cassette size, 15×19 image points are employed. The representation (or display) of the exposed radiograph requires 3×4 image points. However, also other formats of representation (display) can be selected, which, for example, approximately correspond in their number of image points to the dimensions in centimeters. However, in order that the capacity of the memory does not become too great, it is expedient to employ a representation of not over 32 image points for the largest film format.

In FIG. 3b, a horizontally inserted cassette of the size 18 cm×24 cm is illustrated. The format is subdivided nine times. Four radiographs have already been exposed, so that five radiographs are still available.

In the FIGS. 3a and 3b, the characters are imaged in black on a white ground. By contrast, in the case of television fading-in, it is expedient to image them in white on the black background, the darkened corners. For the representation (or display) of these data, also every other type of numerals and characters is conceivable without departing from the concept of the invention. A display indicating whether the fluoroscopy is switched on could also proceed in that, during the fluoroscopy, the viewing screen appears bright, whereas, in the case of a switched-off fluoroscopy, the viewing screen remains darkened.

It will be apparent that many modifications and variations may be effected without departing from the scope of the novel concepts and teachings of the present invention.

We claim as our invention:

1. A diagnostic X-ray installation for radiography and fluoroscopy, said installation comprising an X-ray tube for supplying X-ray energy along an X-ray beam path; an X-ray spotfilm device for positioning an X-ray film in the X-ray beam path during radiography so as to effect exposure of successive subdivisions of the film in accordance with a selected film exposure format; an x-ray image intensifier television chain including an X-ray image intensifier arranged in the X-ray beam path for receiving an X-ray image during fluoroscopy and for supplying a corresponding optical image, a television camera optically coupled with said X-ray image intensifier for supplying a video signal in accordance with the optical image supplied by said X-ray image intensifier during fluroscopy, and a monitor coupled with the television camera for effecting display of the video signal therefrom as a television picture; a control unit connected with said spotfilm device for controlling the exposure of the X-ray film in the X-ray beam path in accordance with a selected film exposure format and having film format setting means for selecting film format setting values characterizing the desired film exposure format of the X-ray exposures to be made on the X-ray film of the spotfilm device during radiography; a signal generator for generating signals operable to control the monitor and having an output, the film format setting means being connected with the signal generator, a mixing stage arranged between the television camera and the monitor, said mixing stage receiving a signal generator output signal from the output of the signal generator which is dependent upon the selected film format setting values at said film format setting means and being operable to superimpose said signal generator output signal on the video signal delivered by the television camera for the purpose of fading-in a representation of the selected film format setting values into the television picture of the monitor, said signal generator supplying as said signal generator output signal a picture generating signal for producing a symbolic pictorial display representing graphically the selected film exposure format and the progress of the X-ray exposures during radiography so that said symbolic pictorial display is faded into the television picture on said monitor, for graphically representing operating status during radiography.

2. A diagnostic X-ray installation according to claim 1 with said signal generator further supplying to said mixing stage a signal for effecting a digital fading-in on the monitor of numerals representing the overall size of the X-ray film of the spotfilm device during radiography.

3. A diagnostic X-ray installation according to claim 1 with said signal generator producing on the monitor a symbolic pictorial display indicating the position of the X-ray film.

4. A diagnostic X-ray installation according to claim 1 with said signal generator producing on said monitor a symbolic pictorial display having an arrangement of subdivisions for representing the subdivisions of the X-ray film of the spotfilm device during radiography.

5. A diagnostic X-ray installation according to claim 4 with said signal generator supplying at its output picture generating signals for filling in the subdivisions on the monitor so as to produce a symbolic pictorial display for graphically representing the number of exposed subdivisions of the X-ray film.

* * * * *